US005562494A

United States Patent [19]

Fujiwara

[11] Patent Number: 5,562,494

[45] Date of Patent: Oct. 8, 1996

[54] WATERTIGHT PLUG AND WATERTIGHT CONNECTOR IN WHICH IT IS USED

[75] Inventor: Yoshihito Fujiwara, Tokyo, Japan

[73] Assignee: The Whitaker Corporation, Wilmington, Del.

[21] Appl. No.: 456,596

[22] Filed: Jun. 1, 1995

[30] Foreign Application Priority Data

Jul. 19, 1994 [JP] Japan .................................... 6-188789

[51] Int. Cl.[6] .................................................. F16J 15/10

[52] U.S. Cl. ........................................ 439/587; 439/275

[58] Field of Search .................................... 439/274, 275, 439/279, 587, 589

[56] References Cited

U.S. PATENT DOCUMENTS

| | | | |
|---|---|---|---|
| 4,150,866 | 4/1979 | Snyder, Jr. et al. | 439/275 |
| 4,281,887 | 8/1981 | Luca, Jr. | 439/589 |
| 4,697,861 | 10/1987 | Mitchell | 439/587 |
| 5,035,638 | 7/1991 | Kourimsky | 439/275 |
| 5,299,949 | 4/1994 | Fortin | 439/589 |
| 5,306,195 | 4/1994 | Hayashi | 439/587 |
| 5,351,973 | 10/1994 | Taniuchi et al. | 439/587 |
| 5,433,621 | 7/1995 | Sai | 439/275 |

FOREIGN PATENT DOCUMENTS

| | | |
|---|---|---|
| 58-2876 | 1/1983 | Japan . |
| 60-71082 | 5/1985 | Japan . |
| 61-26272 | 2/1986 | Japan . |
| 61-194272 | 12/1986 | Japan . |
| 62-134967 | 8/1987 | Japan . |
| 7-142118 | 6/1995 | Japan . |

*Primary Examiner*—Gary E. Elkins

[57] ABSTRACT

A watertight plug 1 comprises a main body 4 having circular ribs 2 on its outside surface and a wire-insertion section having a cylindrical section 12 into which a wire 90 is inserted and an additional circular rib 14 which extends in the same direction as the cylindrical section 12 in radial and backward directions from the area behind the circular ribs 2. The displacement of the cylindrical section 12 caused by the bending of the wire 90 when the plug is inserted in a cavity 102 of a housing 100 does not seriously affect the additional rib 14, thus making it possible to retain water tightness. Axially extending ribs 52, extending between the circular ribs, increase the rigidity of the circular ribs 2 and 14 without adversely increasing the force required to insert the plug into a cavity 102 in an electrical connector.

19 Claims, 4 Drawing Sheets

WATERTIGHT PLUG AND WATERTIGHT CONNECTOR IN WHICH IT IS USED

FIELD OF THE INVENTION

This invention relates to watertight or sealing plugs, especially to those which can withstand the bending of a wire, and to the electrical connectors in which such watertight plugs are used.

BACKGROUND OF THE INVENTION

Methods of providing water tightness to connectors by placing a watertight plug over the insulating sleeve of the wire are known in the art. Such watertight plugs usually have several circular ribs arranged around the main body of the plug which fit tightly against the inside wall of the connector cavity through which a connector contact is passed, thus providing water tightness of the connector.

Watertight plugs of this type are described in Japanese UM Publication No.-2976, Japanese UM Publication No. 85-71082 and Japanese UM Publication NO.87-134967. A typical example of such plugs is shown in FIG. 10. In the drawing, 200 is a watertight plug and 100 is a housing. In this conventional example of the watertight plug 200 there are three circular ribs 202. The water tightness is formed by resilient contact of tips 204 of these ribs 202 with the inside wall 104 of the cavity 102. However, since the watertight plugs are usually made of rubber or other elastic materials, pulling the wire 90 in the direction indicated by arrow A, as shown in the drawing, leads to the deformation of the rib 202 on the side of the direction in which the wire is pulled and to the formation of a gap G between the rib 202 and the inner wall 104 resulting in the failure of the watertight connection. Even if no gap G is formed, the tightness of the connection is reduced which can result in the loss of the water tightness. In other words, the amount of pressure that the seal can resist will be reduced, even if no gap results from bending the wire alone.

One of the proposed methods of solving this problem described in the Japanese UM Publication No. 86-194272 is directed to supplying a wire holder preventing the deformation of the wire 90 in the vicinity of the watertight plug when it is pulled. Japanese UM Publication No. 86-26272 describes a connector equipped with a means of the support of both watertight plug and the wire. However, these connectors have a complicated design and a large number of parts which makes them expensive, while the process of their production or assembly is labor intensive and difficult.

Ribs 202 of such conventional watertight plugs are made flexible to reduce the force required for the insertion of the plug in the cavity 102. On the other hand, the flexibility of the ribs is the reason of the problem described above. If the rigidity of the ribs 202 is increased, the resistance to the insertion is also increased, making the insertion difficult, especially in connectors having many contacts.

SUMMARY OF THE INVENTION

This invention was made taking in account the above considerations, and its purpose is to offer a watertight plug which maintains water tightness formed by the contact between the ribs and the cavity wall even when the plug is deformed when the wire is pulled, and a watertight connector in which such a plug is used. One of the purposes of this invention is to offer a watertight plug, and a watertight connector in which such plugs are used, having watertight properties that are not affected by bending the wire.

Another purpose of this invention is to offer a watertight plug with an improved water tightness due to an increase in the rigidity of the ribs without an increase in the resistance of the plug to insertion in a connector housing cavity, and a connector in which such a watertight plug is used. In other words, the insertion force is not adversely increased, even though the seal is more watertight or any increase in insertion force is negligible when compared to the improved performance of the plug and the connector.

The watertight plug according to this invention is characterized by the fact that it has circular ribs on its main body which is placed over a wire, a wire insertion section with a cylindrical portion tightly fitting around the circumference of the above mentioned wire and an additional circular rib provided on the outer surface in the location of said cylindrical section which extends outside in the radial direction and backward.

A watertight connector according to this invention in which the watertight plug is used compresses a housing with a cavity into which a watertight plug with circular ribs and a wire with an end prepared for the connection to a terminal is inserted, thus assuring water tightness, and that the wire-insertion section of the watertight plug has a cylindrical portion which tightly fits over the circumference of the wire and an additional circular rib provided on the outer surface in the location of the cylindrical section which extends outside in the radial direction and backward, with another circular rib having such a configuration that it tightly fits in the housing cavity regardless of any deformation of the cylindrical section.

A watertight plug according to this invention has a number of circular ribs arranged on the outer surface of its main body whereby near the fixed edges of the circular ribs, several connecting ribs arranged at predetermined intervals are provided between the circular ribs for the purpose of increasing their rigidity.

A watertight connector according to this invention in which a watertight plug of this type is used comprises a housing with a cavity into which a watertight plug with a number of circular ribs and a wire with an end prepared for the connection to a terminal is inserted, thus assuring its water tightness, and that near the fixed edges of the circular ribs, several connecting ribs are arranged at predetermined intervals between the circular ribs for the purpose of increasing the rigidity of the circular ribs.

BRIEF DESCRIPTION OF THE DRAWINGS

Embodiments of the present invention will now be described by way of example with reference to the accompanying drawings in which.

DETAILED DESCRIPTION OF THE INVENTION

Figure 1:
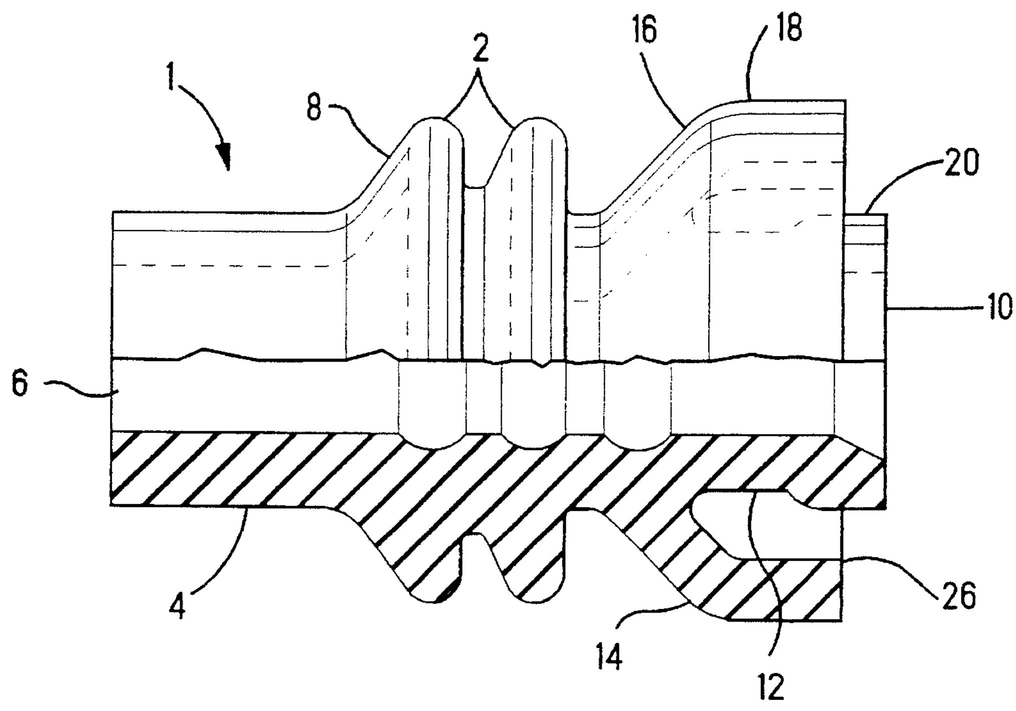
FIG. 1 is a partially sectioned view of a first embodiment of the watertight plug according to this invention.

FIG. 1 represents a partially sectioned view of the watertight plug according to this invention.

A rubber watertight plug 1, or a watertight plug made of other similar material, has in its center a through hole 6 extending in the axial direction into which a wire 90 is inserted. The internal diameter of the through hole 6 is slightly smaller than the outside diameter of the wire 90, so that the plug tightly fits over the insulating sleeve of the wire 90. Near the center of the main body, on its outside surface, two ribs 2 are located. Ribs 2 have tapered surfaces 8 in order to make it easier to insert the plug into the cavity 102 of the housing 100 (see FIG. 2). Ribs tapered in this manner will withstand a greater pressure from one direction (to the right in FIG. 1). Typically higher pressure will exist on the exterior of the connector and plug. Near the side of the wire insertion section 10, behind the ribs 2, a cylindrical section 12 fits tightly over the circumference of the wire 90 and an additional circular rib 14 extends radially outside and back from this cylindrical section 12 just behind the back side of the rearmost rib 2. The rib 14 has a slanted section 16 which is inclined to the back and an extended section 18 located over the cylindrical section 12. As shown in FIG. 1, this extended section 18 is spaced from the cylindrical section 12 and forms a skirt encircling the cylindrical section 12. The outside diameter of the rib 14 is larger than that of the ribs 2. Due to such a configuration, the rib 14 is fully elastic and easily flexible. On the wire-insertion end 10 of the cylindrical section 12, a radially bulging section 20 is formed.

Figure 2:
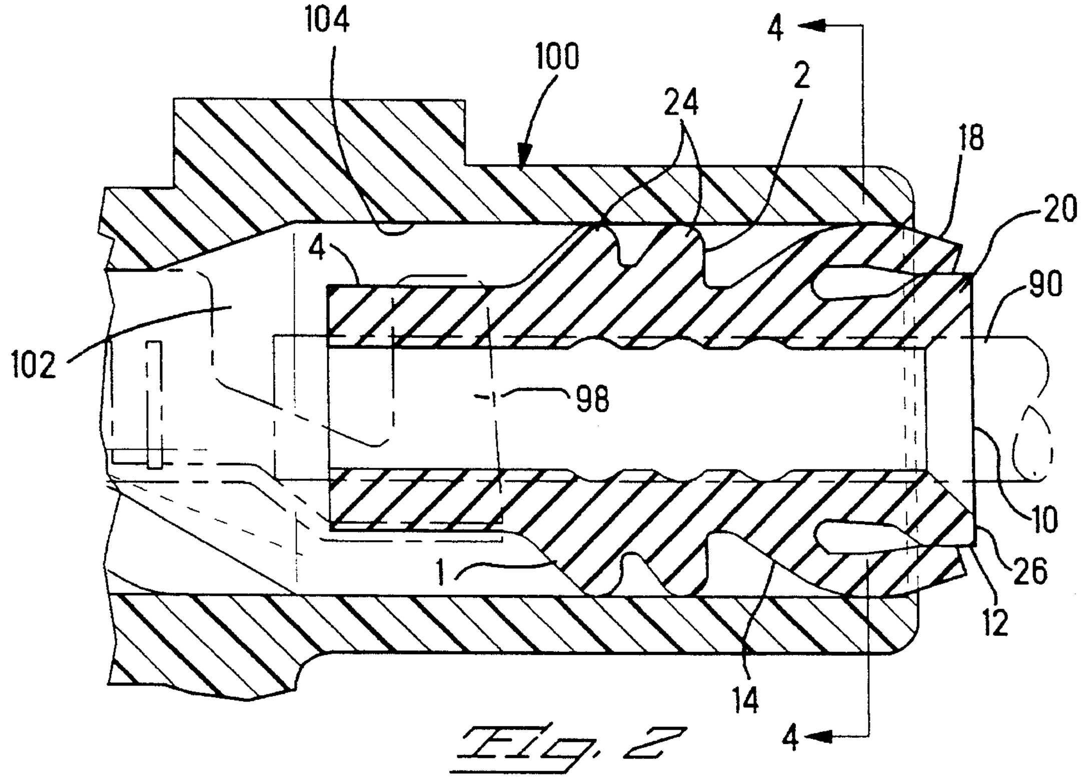
FIG. 2 is a longitudinal cross-section of the watertight plug shown in FIG. 1 in the state when it is inserted in the housing.

FIG. 2 represents a view of the watertight plug 1 described above in the state when it is inserted in the cavity 102 of the housing 100. The wire would be inserted into the cavity from the right as viewed in FIG. 2. In FIG. 2, the contact 98 and the wire 90 are shown by dot-and-dash lines. In FIG. 2, the contact 98 is crimped to the front ends of the watertight plug 1 and on the wire 90. The tips 24 of the ribs 2 of the watertight plug 1 are resiliently pressed to the inside wall 104 of the cavity 102. The rib 14 is also resiliently pressed against the inside wall 104. The inside edge 26 of the extended section 18 of the rib 14 and the area near it are pressed against the bulging section 20. Due to this contact between the extended section 18 and the bulging section 20, the rib 14 is strongly pressed against the inside wall 104.

Figure 3:
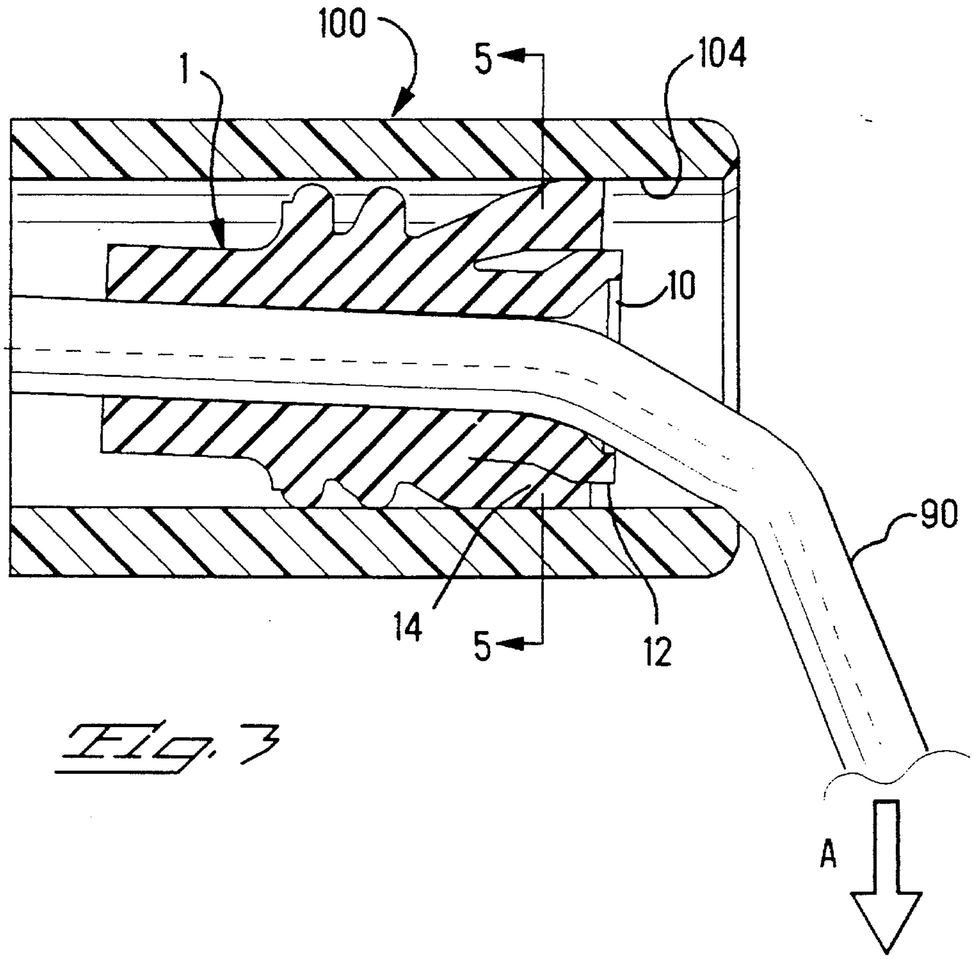
FIG. 3 is a view similar to FIG. 2 illustrating the deformations caused by bending the wire.

FIG. 3 illustrates the state when the wire 90 is pulled in the direction of the arrow A. Due to the bending produced by the wire 90, the watertight plug 1 is displaced or deformed in the direction of the arrow A. However, the effect of this displacement or deformation on the opposite side of the rib 14 is very small, and it continues to be pressed against the inside wall 104, thus maintaining a good water tightness and watertight seal.

Figure 4:
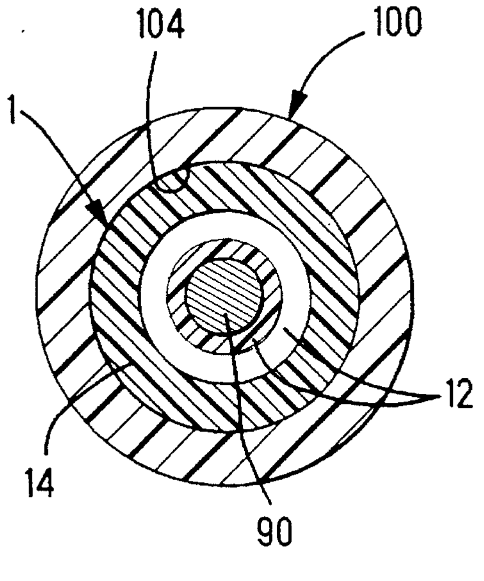
FIG. 4 is a partially cross-sectional view, taken along line 4—4 in FIG. 2, of the watertight plug inserted in the housing before the wire is bent.
Figure 5:
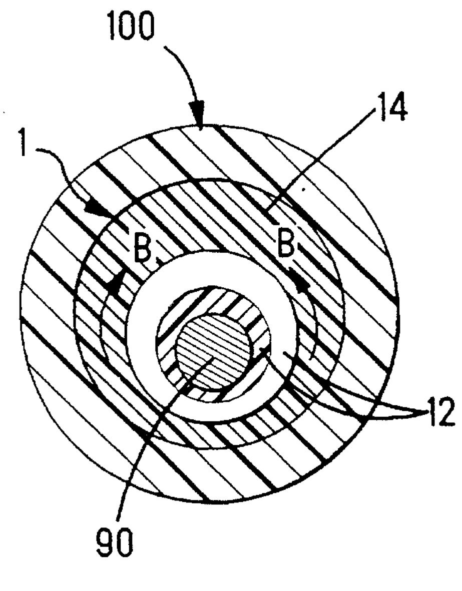
FIG. 5 is a partially cross-sectional view, taken along line 5—5 in FIG. 3, of the watertight plug taken at the same section and showing the deformation caused by bending the wire.

FIGS. 4 and 5 represent the condition of the displacement as seen from the side of the wire-insertion end 10. These cross-sectional views are taken along section lines 4—4 and 5—5 of FIGS. 2 and 3, respectively. Each section is taken at the same axial location relative to both the plug and to the connector. In FIGS. 4 and 5, the wire is shown without the insulating sleeve. FIG. 4 corresponds to the state shown in FIG. 2 when the wire 90 is not bent, and FIG. 5 corresponds to FIG. 3 when the wire is bent. In FIG. 4, the watertight plug 1 provides a uniform pressure on the inside wall 104 of the housing 100 around the wire 90. In FIG. 5, the wire 90 is pulled in the direction indicated by the arrow A in FIG. 3 causing the displacement of the cylindrical section 12 of the watertight plug 1 in the direction of arrow A. Since the volume of the compressed rib 14 remains unchanged, the rubber material is pressed in the directions shown by the arrows B, thus preventing the formation of a gap between the plug and the housing 100.

Figure 6:
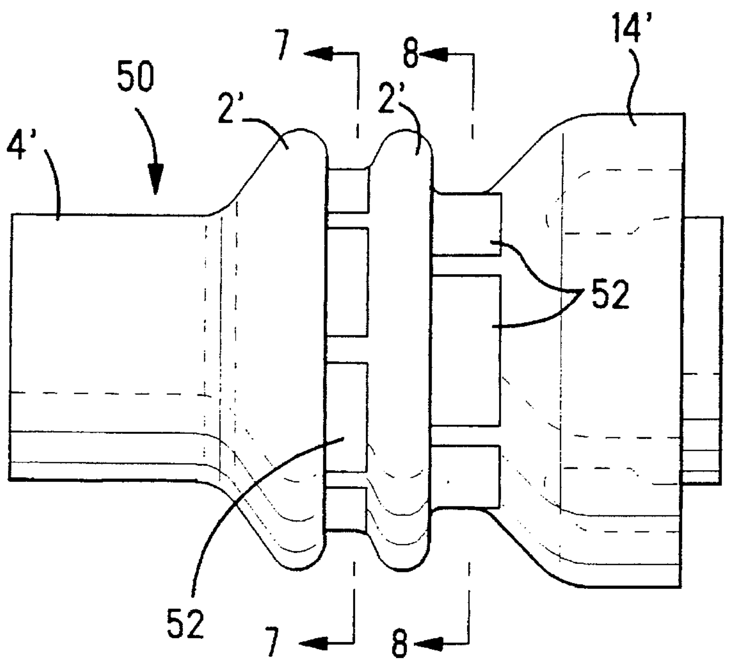
FIG. 6 is a side view of the watertight plug according to a second embodiment of this invention.

A watertight plug 50 according to the second embodiment of this invention is shown in FIG. 6. The same elements of the watertight plug 50 as the elements of the watertight plug 1 are marked by the same numbers with primes. The watertight plug 50 has basically the same external configuration as the watertight plug 1. The difference from the watertight plug 1 is that between ribs 2', 2' and 14', connecting ribs 52 are formed as an integral part of the plug. Connecting ribs 52 extend axially along the outer surface of the main cylindrical body 4 of the plug. The connecting ribs 52 extending between the ribs 2' and 2', and between ribs 2' and 14' are arranged at predetermined intervals between them or at angular positions around the circumference of the main cylindrical body 4' of the plug. The connecting ribs 52 increase the rigidity of the ribs 2', 2' and 14', and, at the same time, they do not compromise their flexibility. In this embodiment, the connecting ribs 52 located between ribs 2' and 2', and connecting ribs 52 located between the ribs 2' and 14' are located at different angular positions to provide a uniform reaction in response to the bending of the wire 90.

Figure 7:
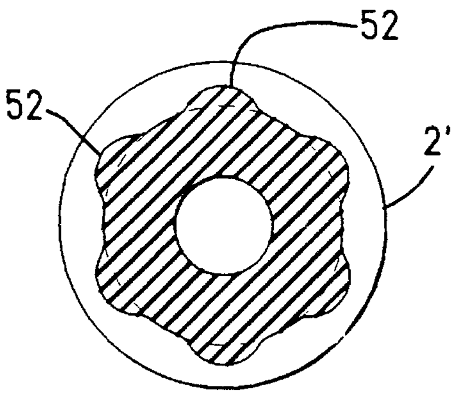
FIG. 7 is a cross-sectional view of the watertight plug shown in FIG. 6 along the line 7—7.
Figure 8:
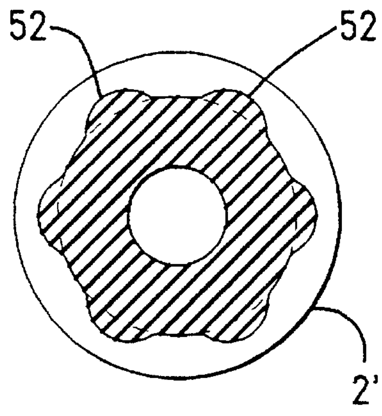
FIG. 8 is a cross-sectional view of the watertight plug shown in FIG. 6 along the line 8—8.

FIGS. 7 and 8 represent cross-sectional views of the watertight plug 50 shown in FIG. 6. FIG. 7 is a cross-sectional view along the line 7—7 of FIG. 5, and FIG. 8 is a cross-sectional view along line 8—8 of FIG. 6. In these cross sections, one can see that the outline of the connecting ribs 52' near the fixed ends of the ribs 2', 2' and 14' is curved or arcuate. There are six connecting ribs 52 between the ribs 2' and 2'; and the connecting ribs 52 located between the ribs 2' and 14' are shifted relative to the connecting ribs between the ribs 2' and 2' by about half a pitch. The dimensions, configuration and location of these connecting ribs may vary depending on the configuration of the ribs 2', 2' and 14' or the material from which the watertight plug and 50 is made. The effect of such a configuration is that it is possible to produce ribs 2', 2' and 14' with an increased rigidity without increasing the force required for the insertion of the watertight plug 50 by varying the configuration and arrangement of the connecting ribs.

Figure 9:
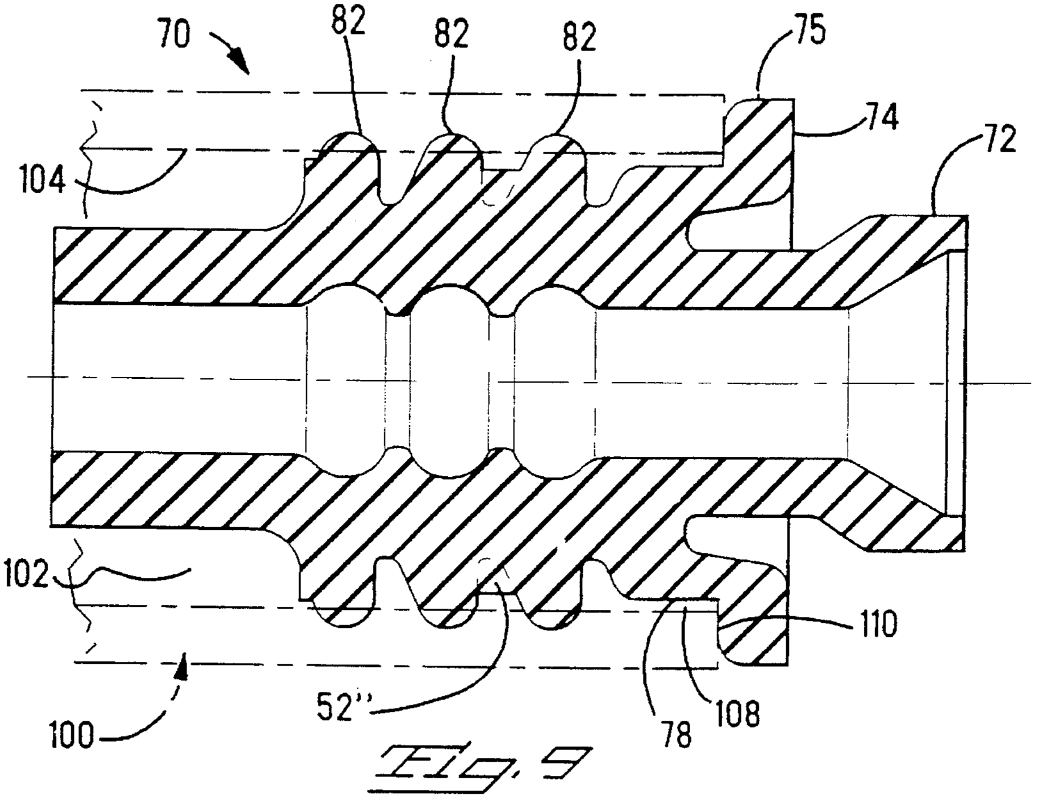
FIG. 9 is a longitudinal cross-sectional view of the watertight plug according to a third embodiment of this invention.

FIG. 9 depicts the third embodiment of the watertight plug according to this invention. The configuration of the cylindrical section 72 and of the rib 74 of this watertight plug 70 are basically the same as the similar elements of the watertight plugs 1 and 50 according to the first and second embodiments. This watertight plug is mounted in the end of the opening 108 of the housing 100. The rib 74 is extended outwardly back from the cylindrical section 72, and it has a flange 75 outward and perpendicular to the axis of the watertight plug 70. This flange provides water tightness by being pressed against the end surface of the housing 100.

The dimension of the ring-shaped section 78 of the rib 74 is selected so that it fits inside the cavity 102 against its inside wall 104. Inside the cavity 102, water tightness is created by ribs 82, 82, 82 as in the first and the second embodiments. Since the cylindrical section 72 of the watertight plug 70 is separated from the rib 74 by some distance, the deformation of the cylindrical section 72 due to the bending of the wire 90 does not affect the tightness of the plug with the housing 100. This provides for a reliable water tightness and watertight seed. Since the opening 108 of the housing 100 is covered, no water accumulates near the opening 108; this configuration also makes it possible to prevent penetration of water inside the cavity 102 due to the suction effect produced by temperature variations. Part 52' is a connecting rib similar to those used in the second embodiment depicted in FIG. 6.

Data concerning the relative efficiency of the previously described embodiments is presented in Table 1.

TABLE 1

Comparison of Sealing Performance

| Measurement Conditions | Conventional | | | Sealing Grommet 1 (1st Embodiment) initial value | | | Sealing Grommet 70 (3rd Embodiment) | | |
|---|---|---|---|---|---|---|---|---|---|
| | Construction | | | | | | | | |
| Measurement | 2.0* | | | 2.0* | | | 2.0* | | |
| Cavity | 1 | 2 | 3 | 1 | 2 | 3 | 1 | 2 | 3 |
| Pulling Direction (weight: 3 kgf) | | | | | | | | | |
| Horizontal | 0.6 | 0.6 | 1.4 | 2.0* | 2.0* | 2.0* | 2.0* | 2.0* | 2.0* |
| 90° upper | 0.4 | 0.3 | 0.4 | 2.0* | 1.6 | 1.6 | 0.8 | 1.6 | 1.4 |
| 90° left | 0.7 | 0.6 | 0.4 | 1.6 | 1.8 | 1.8 | 1.4 | 2.0* | 1.8 |
| 90° down | 0.7 | 0.5 | 0.4 | 2.0* | 2.0* | 2.0* | 1.6 | 1.8 | 1.8 |

Figure 10:
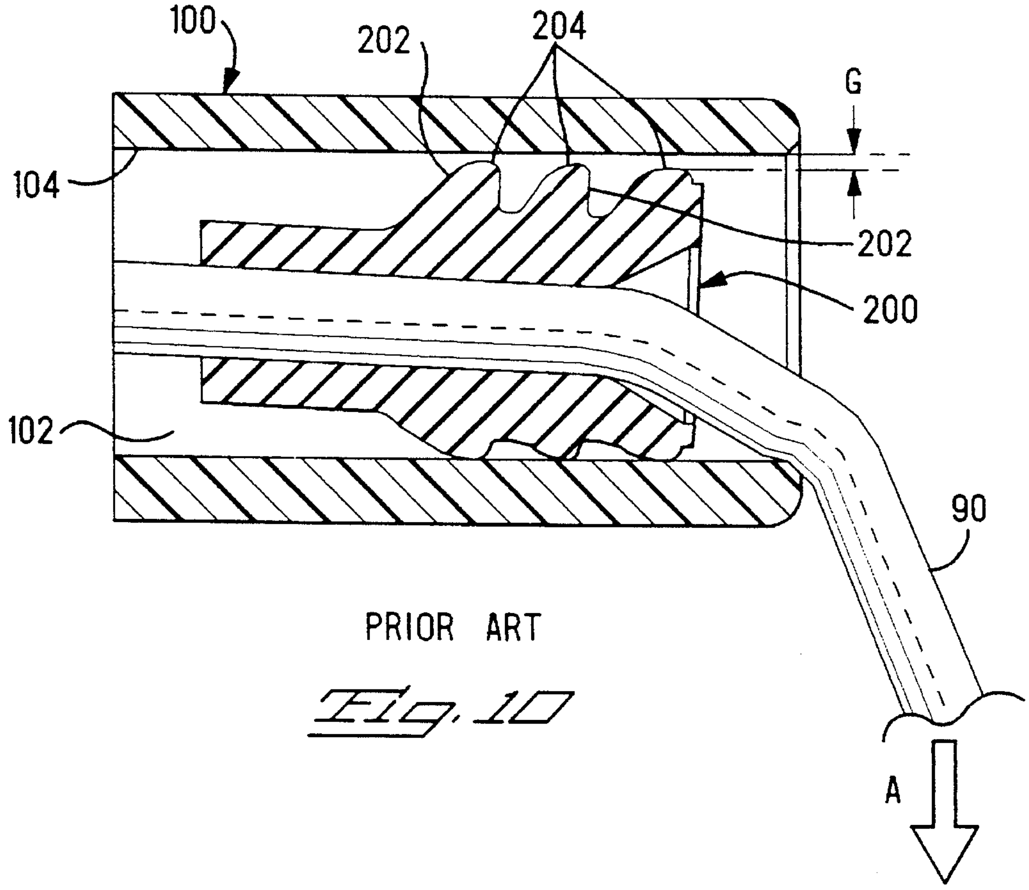
PRIOR ART Fig. 10
FIG. 10 is a longitudinal cross-sectional view of a watertight connector in which a conventional prior art watertight plug is used.

This data compares the water tightness characteristics measured on the watertight plugs 1 and 70 according respectively to the first and the third embodiments, and of a conventional watertight plug 100 shown in FIG. 10. The connector has four poles, that is four cavities 102 are used in it. One cavity is used for pumping air, and in the remaining three, watertight plugs are inserted. The air pressure is registered to determine the moment when a water leakage through the plugs takes place. A load of 3 kgf is applied to the wire. The wire is bent in four directions, and the tightness is expressed in the terms of air pressure. Larger values correspond to a better tightness. Values shown in the Table as [2.0*] correspond to the limit of the measuring instrument of 2.0 kgf/cm$^2$, and no higher values could be recorded. As can be readily understood from this Table, the watertight plugs according to this invention and connectors in which they are used have water tightness two to five times higher than conventional products.

Due to the fact that the watertight plug and watertight connector according to this invention has an additional circular rib extending back in the direction of the cylindrical portion which fits tightly around the wire inserted into it, this invention has the following effects:

Since the additional circular rib does not experience strong deformation even when the cylindrical portion is deformed by the bending of the wire, its tight contact with the housing remains undisturbed, which makes it possible to maintain watertight properties of the connector. The additional circular ring enhances the water tightness also due to the fact that when it is deformed so that it comes in contact with the cylindrical section, its pressure against the internal wall of the cavity increases.

In another watertight plug and watertight connector according to this invention, a number of connecting ribs are provided between the circular ribs in the area of their fixed ends arranged at predetermined intervals between each other, which produces the following effect:

The connecting rings increase the rigidity of the circular rings making them less susceptible to deformation when the wire is bent. And since the connecting rings are arranged at predetermined intervals, the rigidity does not exceed required limits and does not affect the insertion into the cavity.

Since all the watertight plugs described above are of a simple design and do not require the use of special materials, they are cost effective and production is relatively easy.

Although detailed explanations concerning preferred embodiments of this invention, but it is needless to say that various modifications and changes may be introduced in these embodiments without deviating from the essential elements of the invention.

For example, the rib 14 of the watertight plug according to the first embodiment may be made without the extension in the axial direction but only with a slanted part, provided that it comes in contact with the cylindrical section when deformed. The size of the bulging section 20 also can be changed according to the dimensions of the cavity 102.

Plugs employing this invention can also be used in other configurations. For example, this invention can be used on plugs in which the wire is terminated to an electrical terminal prior to insertion through the plug. For example a cylindrical pin or socket terminal can be attached to the wire. Both the terminal and the wire could be inserted through the plug and the plug could be fabricated from a material having sufficient resiliency to still engage the wire after insertion. Also this invention is not limited to watertight sealing applications. It could be employed for pneumatic sealing. Therefore the following claims are not limited to the preferred embodiments depicted herein, but are also applicable to similar devices apparent to one of ordinary skill and to equivalent plugs and seals.

I claim:

1. A watertight plug comprising a main body through which a wire may be placed:

characterized by the fact that a wire-insertion section of said watertight plug has a cylindrical section for tightly fitting around the circumference of said wire and a radially extending circumferential rib on the outer surface in the location of said cylindrical section which extends outwardly in the radial direction and axially rearward so that the circumferential rib is not deformed by the same extent as the cylindrical section when the wire is bent or displaced.

2. The watertight plug of claim 1 wherein at least first and second ribs are formed on the exterior of the main body, the first rib comprising the circumferential rib extending axially rearwardly being on the rear of the main body.

3. The watertight plug of claim 2 wherein the rear circumferential rib includes an axially extending skirt spaced from the cylindrical section of the main body and joined to the main body by a radially extending section.

4. The watertight plug of claim 3 wherein the cylindrical section includes a budging section at its rear end, spaced from the skirt in the absence of radially inward pressure applied to the skirt.

5. The watertight plug of claim 3 wherein the first rib extends further radially outward than the second rib in the absence of radially inward pressure applied to the ribs.

6. The watertight plug of claim 2 wherein the second rib is radially outwardly tapered, the taper extending generally rearwardly to facilitate insertion of the plug into a cavity.

7. The watertight plug of claim 2 wherein the cylindrical section includes a flange extending around the cylindrical section for engaging the end of a cavity in which the watertight plug is positioned.

8. The watertight plug of claim 2 wherein axially extending connecting ribs extend between the first and second ribs at multiple angular positions around the main body.

9. A watertight plug having a number of circular ribs extending circumferentially around the outer surface of its main body and characterized by:

multiple connecting ribs, on the outer surface of said main body, extending axially between said circular ribs at predetermined intervals for increasing the rigidity of the circular ribs.

10. The watertight plug of claim 9 wherein connecting ribs extending between first and second circular ribs are angularly offset relative to connecting ribs extending between said second and a third circular rib.

11. The watertight plug of claim 9 wherein at least one of the ribs is radially outwardly tapered from an inner thicker section, the connecting ribs extending from the thicker sections.

12. The watertight plug of claim 9 wherein the height of the connecting ribs is less than the height of the circular ribs.

13. A watertight connector in which a watertight plug is used, the connector including a housing with at least one cavity in which a watertight plug is positioned, the watertight plug being configured to surround a wire and configured with circular ribs to engage the cavity, thus assuring water tightness, characterized by the fact that a wire-insertion section of said watertight plug has a cylindrical section configured to tightly fits over the outer surface of the wire and an additional circular rib provided on the outer surface in the location of said cylindrical section which extends outside in the radial direction and rearward, said additional circular rib being configured to tightly fit in the cavity regardless of deformation of the cylindrical section.

14. The watertight connector of claim 13 wherein the cylindrical section and the additional rib are located adjacent an exterior end of the cavity.

15. The watertight connector of claim 14 wherein said additional rib includes a rearwardly extending skirt spaced from the cylindrical section, the plug including a bulging section at the rear end, the skirt engaging the bulging section when the plug is positioned in the cavity.

16. The watertight connector of claim 14 wherein the additional rib extends further radially outward than the circular ribs prior to insertion into the cavity so that the additional rib is inwardly deflected by a greater amount upon insertion into the cavity.

17. The watertight connector of claim 14 wherein the circular ribs are tapered rearwardly and the additional rib includes a rearwardly extending skirt.

18. The watertight connector of claim 13 wherein the main body includes a forward section to which a terminal attached to said wire can be attached.

19. A watertight connector in which a watertight plug is used having a housing with a cavity into which the watertight plug with a number of circular ribs and a wire with an end prepared for the connection to a terminal is inserted thus assuring its water tightness, characterized by the fact that near the fixed ends of said circular ribs, several connecting ribs arranged at predetermined intervals are provided between the circular ribs for the purpose of increasing their rigidity.

* * * * *